United States Patent

[11] 3,631,486

[72] Inventors: Roland A. Anders; David E. Callahan, both of Baltimore; F. Stewart Myers, Jr., Severna Park; James M. Saboe, Ellicott City, all of Md.
[21] Appl. No.: 835,995
[22] Filed: June 24, 1969
[45] Patented: Dec. 28, 1971
[73] Assignee: Westinghouse Electric Corporation, Pittsburgh, Pa.

[54] PROCESSING METHOD AND COMMUTATION SYSTEM FOR PULSE DOPPLER RADAR
17 Claims, 5 Drawing Figs.

[52] U.S. Cl. .................................................. 343/8, 343/5 DP
[51] Int. Cl. .................................................. G01s 9/44
[50] Field of Search .......................... 343/5 DP, 8

[56] References Cited
UNITED STATES PATENTS
3,140,486  7/1964  Gillmer ..................... 343/8

Primary Examiner—T. H. Tubbesing
Attorneys—F. H. Henson and E. P. Klipfel

ABSTRACT: In a pulse Doppler radar system, a threshold level for target detection is automatically adjusted as a function of clutter and noise. A commutation network for interrogating each of a plurality of Doppler channels simultaneously interrogates channels of adjacent higher and lower frequencies for deriving a threshold signal comprising an average or normalized detection threshold for the interrogated channel, for all channels. The commutation system also provides for enhancement of the accuracy of velocity measurement of a given number of Doppler channels by interpolating between consecutive pairs of channels.

INVENTORS
ROLAND A. ANDERS
DAVID E. CALLAHAN
F. STEWART MYERS, JR.
JAMES M. SABOE

INVENTORS
ROLAND A. ANDERS
DAVID E. CALLAHAN
F. STEWART MYERS, JR.
JAMES M. SABOE

BY

ATTORNEY

INVENTORS
ROLAND A. ANDERS
DAVID E. CALLAHAN
F. STEWART MYERS, JR.
JAMES M. SABOE

INVENTORS
ROLAND A. ANDERS
DAVID E. CALLAHAN
F. STEWART MYERS, JR.
JAMES M. SABOE

ATTORNEY

PROCESSING METHOD AND COMMUTATION SYSTEM FOR PULSE DOPPLER RADAR

BACKGROUND OF THE INVENTION

1. Field of the Invention

This invention relates to a pulse Doppler radar system and, more particularly, to a processing method and commutation system for automatic threshold control for improved automatic target detection and enhanced accuracy of Doppler velocity measurements.

2. Description of the Prior Art

In a pulse Doppler radar system, the detection of targets requires the ability to distinguish a reflected signal from noise and clutter signals which are also received. For the system to be accurate and reliable, it is desirable to maintain a constant false alarm rate, or a fixed detection level with respect to the signal-to-noise ratio of the returned signals. This is a particular problem in pulse Doppler radar because of the large amounts of side lobe clutter that may occur. In airborne radar, for example, the clutter will occur in frequencies ranging from the negative to the positive Doppler velocity and the spectral density will vary with terrain, aircraft velocity, and altitude. Noise signals which are normally introduced in any electrical transmission similarly will be present in the reflected Doppler signal and additionally will be produced by minor perturbations or variations in the terrain or nontarget sources from which a transmitted signal is reflected.

Many efforts have been made heretofore in the prior art for attempting to achieve and maintain a constant false alarm rate for such pulse Doppler radar systems. A rudimentary technique is to manually adjust the gain of each channel while visually inspecting the displayed targets from that channel to eliminate targets which, in the opinion of the operator, are false and resultant only from detection of clutter and noise. Another approach is to provide an automatic gain control circuit such as including an envelope detector and a post detection integrator to establish a detection threshold level. Such automatic gain control systems, if broad band, produce a distorted threshold level responsive primarily to the high spectral density at zero Doppler frequency, such as resultant from the ground wave reflection, whereby undesirable and unnecessary loss in sensitivity occurs in the remainder of the band. Additional approaches include the use of dual time constant circuits for each channel, the circuits having substantially different fast and slow time constants. Whereas side lobe clutter and noise, assumed to be essentially constant over a small frequency band, would produce essentially the same output from each time constant circuit, a signal including a true target return would produce an increased amplitude output from the fast time constant circuit. By cancelling the outputs of the time constant circuits, an increase in signal-to-noise ratio is provided.

These prior art techniques for improving the signal-to-noise ratio have been inadequate, however, and automatic detection in a clutter environment is seldom attempted in present pulse Doppler systems. For example, the automatic gain control systems set up on the noise level regardless of the frequency band under consideration and fail to produce a meaningful threshold level for the full bandwidth of detected signal frequencies. The dual time constant and similar double threshold detection systems similarly fail to accurately maintain a constant false alarm rate for achieving accurate target signal detection.

In addition, the accuracy of range rate determination in the subject type of contiguous filter pulse Doppler systems is limited to the equivalent of one filter channel bandwidth and, in a practical case, three or more channel bandwidths, due to the overlapping response characteristics, or skirts, of the successive contiguous filters. The range-rate resolution, of course, is a function of the achievable band pass sharpness or tuning. The limiting factor on achievable resolution is thus a function of the number of filters which may economically be provided, and the permissible size and weight of the system, for a given range of frequencies, or closing velocities, which are to be detected.

SUMMARY OF THE INVENTION

In accordance with the invention, there is provided a processing method and commutation system for a contiguous filter pulse Doppler radar system which achieves a substantially increased target signal-to-noise ratio by establishing a normalized and automatically controlled threshold detection level and thus a constant false alarm rate. The method and system also provide for enhancing the accuracy of velocity determination, or range-rate resolution, by interpolating between pairs of successive, contiguous channels.

The normalized reference for maintaining the constant false alarm rate is derived, for a given channel under interrogation, by examining the outputs of neighboring channels representing frequencies close to that of the interrogated channel. Despite the recognized variation of spectral density with frequency, it is proper to assume, and may be shown, that over narrow ranges of frequencies the noise level including clutter is substantially linear. Thus, the outputs from the neighboring channels are detected and averaged to define a normalized detection threshold being interrogated. By this processing method, automatic, constant false alarm rate detection is provided for any narrow band signals despite the presence of noise, in the frequency band of the signals and adjacent frequency bands, which is relatively wide band with respect to the signal and with respect to an individual channel bandwidth.

The detection threshold thus established automatically varies with varying signal-to-noise ratios resultant from the above-noted variable factors within a given channel frequency, and automatically varies in accordance with the different frequencies of the successively interrogated channels. Substantially improved accuracy of target signal detection is thus afforded over not only the conventional fixed threshold systems of the prior art, but also the noted prior art efforts to provide automatic threshold control systems. If desired, the circuitry providing the automatic threshold level may be combined with operator control when purely automatic detection is not desired, and thereby substantially improve operator efficiency.

The processing method of the invention improves the accuracy of velocity measurement by interpolating between the outputs of consecutive, adjacent pairs of filter channels. The interpolation technique improves the accuracy of velocity measurements by a factor of 2:1 for fixed Doppler channel bandwidths or, alternatively, permits employing one-half the number of channel filters for a given frequency band. The accuracy enhancement also permits reducing the velocity acquisition time in a search/track radar by permitting reduction of the sweep frequency range of an acquisition variable frequency oscillator, because of improved knowledge of the target's Doppler frequency.

The interpolation technique, in effect, is based on recognition that there is a substantial overlap of the bandwidths of adjacent filters. Since there is an equal probability of a target Doppler frequency being anywhere within a filter band-pass, then there is a significant probability that a signal target will result in detected outputs from two adjoining filters. The finite width of the target spectrum, of course, also contributes to this probability. The interpolation is performed by averaging the outputs of consecutive pairs of contiguous filters. The interpolated output is thus presented as the output of an effective channel intermediate two actual channels.

Thus, for both the interpolated or effective channel outputs and the actual channel outputs of individual filter channels, the detection decision is based on a comparison of that output with a corresponding reference threshold level, with signal detection being effected in any case in which the ratio of an actual or effective channel output to the reference threshold level exceeds unity.

The commutation system of the invention preferably comprises solid state switching and logic circuitry for effecting interrogation, in sequence, of successive channels of a bank of Doppler frequency channels at a desired scanning rate and for detecting the outputs of channels neighboring each successively interrogated channel to establish a threshold level for that interrogated channel. For this purpose, the circuitry includes three switches connected to each filter output and selectively actuated in accordance with interrogation of that channel to derive a signal output or for use of the output thereof as reference level information. Each channel it will be appreciated, is employed as a higher and lower frequency reference for lower and higher, respectively, adjacent frequency channels. Dummy filter channels which are not interrogated for signal purposes but employed solely as reference channels are provided at each end of the bank of filter channels.

The commutation system also provides for selecting which, and the number of, adjacent higher and lower frequency filter channels which are to be employed as a reference for an interrogated channel. Further, the system provides for automatically interrogating a consecutive pair of channels for deriving signal outputs and simultaneously interrogating appropriately selected reference channels to establish a threshold level for the detected signal outputs, and for automatically averaging the values of those consecutive, simultaneously interrogated signal channels to provide an interpolated output effectively representing the output of a channel intermediate the two consecutive channels. A clock-driven, gating logic circuit provides for driving the commutation system to effect switch actuation in accordance with the foregoing interrogation sequence.

The processing method and commutation system of the invention thus provide for greatly improved constant false alarm rate detection and for substantial enhancement of the accuracy of the velocity measurement in a pulse Doppler radar system. Further objects and advantages of the present invention will be apparent and more readily understood from the following detailed description.

DESCRIPTION OF THE PREFERRED EMBODIMENTS

Figure 1:
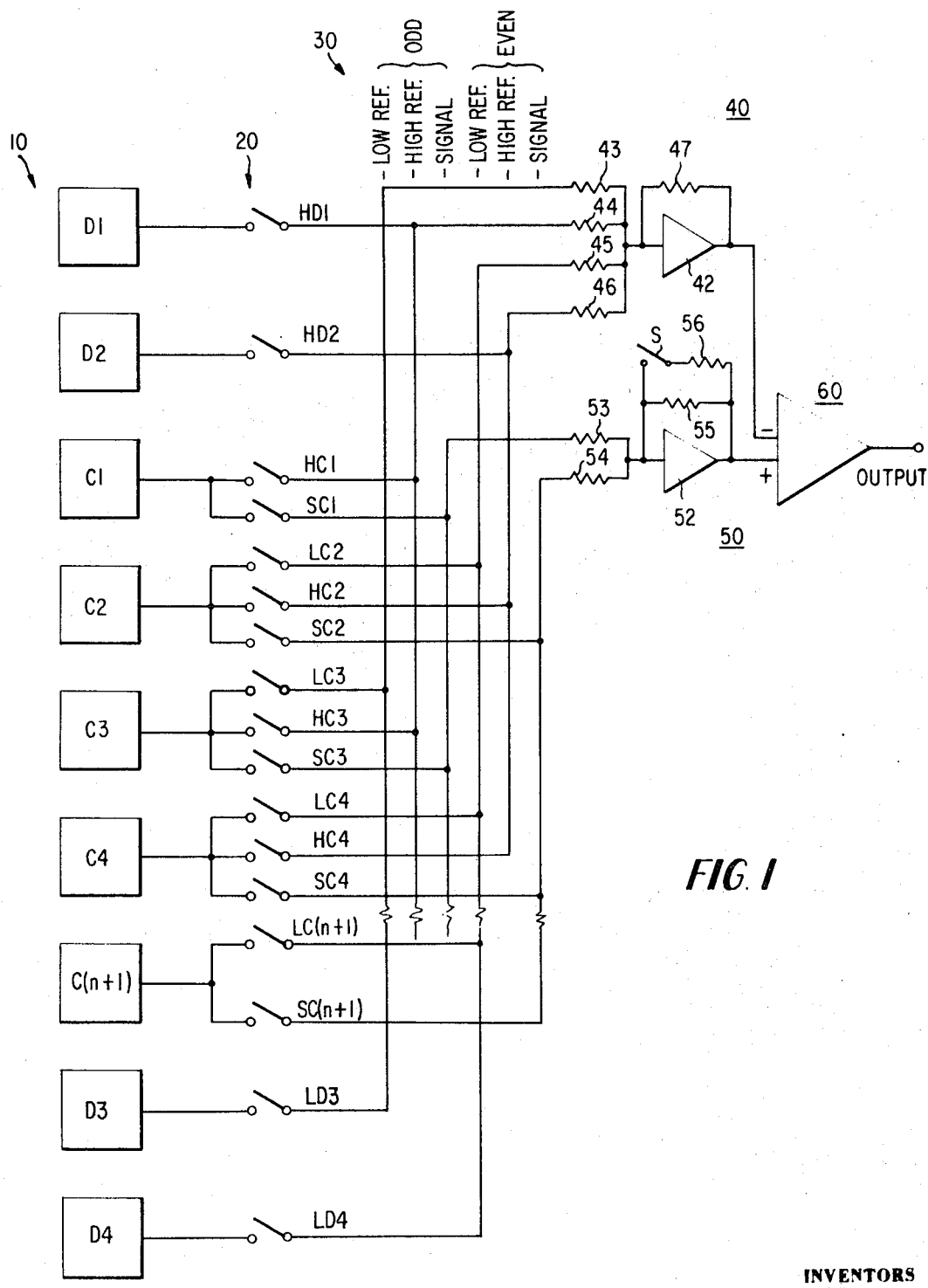
FIG. 1 is a schematic diagram of the commutation system of the invention.

The processing method and commutation system of the invention for providing an automatically controlled threshold detection level in pulse Doppler radar systems utilizes the observed phenomenon that over a narrow range of frequencies, the noise level and clutter in received signals is substantially linear. The invention provides, therefore, for determining the noise level, hereinafter interpreted to include any of various forms of noise including clutter, as a function of the noise level detected in adjacent or neighboring filter channels for each channel as it is interrogated for detection of a target signal output. Various system parameters and other variables such as the source of noise or the nature of that source define the particular channels which should be selected for optimizing the accuracy of detection in accordance with the invention. These parameters include, for example, the number of filter channels of a given system and the frequency range to be encompassed thereby and the band-pass characteristics of each such filter channel. Similarly, different sources of noise such as those resultant from conventional reflected noise patterns as contrasted to noise resultant from intentional jamming efforts may require different reference channel selections for optimizing the accuracy of the threshold detection level control. In accordance with a further feature of the invention, interpolation of adjacent channels may be effected by simultaneous interrogation of adjacent pairs of filter channels. The interpolation technique affords an improvement in the accuracy of velocity measurements by a factor of 2:1. Where such interpolation is implemented in a system in accordance with the invention, the selection of reference channels must again be considered with regard to optimizing both the accuracy of the automatically adjusted threshold detection level and the enhancement of the velocity measurement accuracy by means of the interpolation function. Having due regard to these factors which control the selection of reference channels, the disclosed embodiment of the invention provides for selection of the two next lower and the two next higher frequency filter channels as reference channels for each channel or channel pair interrogated as a signal source.

The disclosed embodiment of the invention band-pass assumes substantially linear noise levels over the range of frequencies encompassing the maximum of six filter channels. In a practical system, such a number of filter channels and even a somewhat greater number satisfy the assumed condition of noise linearity. It is also apparent that the noise within any given group of signal and reference channels is assumed to be, by contrast, broad band with respect to the band-pass of a single filter channel and particularly with respect to the bandwidth of a target signal. Thus, various combinations of reference channels may be selected, which reference channels need not be immediately adjacent an interrogated channel nor all successive adjacent channels.

In FIG. 1 is shown a switching network and associated scaling circuits in accordance with the commutation system of the invention. A bank 10 of filter channels includes signal channels C1, C2,...C($n$+1) which are selectively interrogated for signal detection and for reference level information. In accordance with the disclosed embodiment employing two channels, as above noted, there are accordingly provided four dummy channels D1 through D4. Assuming channel C1 to be the highest signal frequency channel, the dummy channels D2 and D1 are of successively higher frequencies and of the same individual bandwidths as the signal channels, such as C1. Similarly, channels D3 and D4 are of successively lower filter frequencies. The commutation system includes a bank 20 of selectively actuated switches which are in the normally opened positions indicated and selectively closed by a gating system described hereinafter. Each of the switches provides for selective connection of the output of a corresponding channel to a predetermined one of a plurality of buses 30.

For convenience of identifying the buses, each is labeled with the signal selectively applied thereto by the closure of the switches 20. In addition, to facilitate explanation of the commutation sequence, the buses are identified in groups labeled odd and even, corresponding to the arbitrary designation of the channels by odd numbers, such as C1, C3, and even numbers, such as C2, C4... The numerical designations of the dummy channels D1 through D4 similarly correspond to the designation of the odd and even buses. Thus, there is provided for each group of odd and even buses, a low reference, a high reference, and a signal bus.

It will be appreciated that in a practical system, a large number of filter channels are provided and thus only a representative number of such filter channels are shown in FIG. 1. A majority of switches 20 comprise three position switches, therefore, as shown associated with channels C2 through C4. Channel C2 thus includes a set of three switches LC2, HC2, and SC2 which are selectively closed in accordance with interrogation of channel C2 as a lower frequency reference channel for a higher channel being interrogated, as a higher frequency reference channel for a lower frequency channel being interrogated, and as a signal channel, respectively. The switches LC2, HC2 and SC2 are correspondingly connected to the even group of buses low reference, high reference, and signal, respectively. Similarly, the switches LC3, HC3, and SC3 associated with channel C3 are connected to the odd group of buses low reference, high reference, and signal, respectively. As both the high and low frequency extremes of the bank of filters 10, there necessarily result certain filters requiring a reduced number of switch contacts. For example, the highest frequency channel C1 is interrogated as a higher frequency reference for lower frequency signal interrogated channels and as a signal channel but not as a lower frequency reference channel. Thus, only switches HC1 and SC1 connected to the odd high frequency bus and the odd signal bus are provided. The dummy channels D1 and D2 are interrogated exclusively as higher frequency reference signal sources and thus are provided with reference signal switches HD1 and HD2, respectively, connected to the high frequency odd and even buses, respectively. A similar analysis explains the reduced number of switches provided for the lowest frequency channels C(n+1) and the low frequency dummy channels D3 and D4.

A threshold level scaling circuit 40 includes a summing amplifier 42 connected at its input through parallel connected resistors 43, 44, 45, and 46 to the reference buses and thus to the odd low and high, and even low and high reference buses, respectively. The scaling circuit 40 further includes a feedback resistor 47 between the input and output of the summing amplifier 42 which effects a division by four of the input to amplifier 42 in the output produced thereby. As a result, the output of amplifier 42 comprises a signal having an amplitude equal to the average of the reference signals on the reference buses.

A signal scaling circuit 50 includes a summing amplifier 52 connected at its input through parallel connected resistors 53 and 54 to the odd and even signal buses, respectively. A feedback resistor 55 is connected between the output and input of amplifier 52 in a conventional configuration such that if only a single signal is present on the two signal buses, the output of the amplifier 52 is of the same amplitude as the input. The signal scaling circuit 50 further provides for selective response to the interpolation operation, above described. For this purpose, an additional feedback path including resistor 56 and switch S is connected between the output and input of amplifier 52. When two consecutive signal channels such as C1 and C2 are simultaneously interrogated as signal sources, and thus during interpolation operations, switch S is automatically closed to include resistor 56 in parallel with resistor 55. Resistors 56 and 55 are of equal resistance value and thus, when connected in parallel, the negative feedback signal to the amplifier 52 causes the output thereof to be reduced in half. Thus, during interpolation operations, the amplifier 52 produces an output equal to the average of the two signals produced from the simultaneously interrogated channels. The outputs of the threshold level, or reference scaling circuit 40 and the signal scaling circuit 50 are applied to a comparator circuit 60 which generates an output signal only for the condition that the amplitude of the signal from the signal scaling circuit 50 exceeds a threshold level determined by the reference scaling circuit 40. Generally, an output is to be produced only when the signal-to-noise ratio exceeds unity. However, it is typical to provide a so-called guard band such that the signal must exceed the noise level by a preselected amount, or portion, i.e., if the threshold or reference is established at the detected noise level, then the ratio of the signal to the reference must exceed a predetermined value greater than unity.

This result may readily be obtained in the selection of appropriate resistance values of the resistors in the scaling circuits 40 and 50. The resistance value of resistors 43 through 46 and 53 and 54 may be equal, and equal to the resistance of each of resistors 55 and 56. Where the signal to reference level is to exceed a predetermined value $\alpha$, greater than unity, for detection to occur, and where the value of resistor 47 is represented by $R_2/4$ and the value of resistor 55 by $R_1$, the following relationship may be established:

$$\alpha = R_2/R_1$$

The operation of the commutation system of FIG. 1 will now be explained, first for interrogation of a single channel with the two adjacent channels on each side, i.e., the two next successively higher, and the two next successively lower frequency channels, selected as reference channels, and then for interrogation of a pair of immediately adjacent channels for interpolation purposes, with the two adjacent channels on each side of the pair of channels selected as reference channels. For interrogation of the highest frequency channel C1, switch SC1 is closed for supplying a signal through the odd signal bus to the signal scaling circuit 50. Simultaneously, the switches HD1, HD2, LC2, and LC3 are closed to interrogate their corresponding filter channels to provide two higher frequency reference signals and two lower frequency reference signals. In accordance with the foregoing explanation, if the output of circuit 50 corresponding to the signal exceeds the output of circuit 40 corresponding to the reference by a ratio exceeding the value $\alpha$ a detected output signal is produced by the comparator 60.

During an interpolation interrogation, two adjacent signal channels are interrogated and the next two higher and two lower frequency channels are employed as references. Thus, following interrogation of channel C1 as a signal source, and in the normal scanning sequence, channels C1 and C2 are simultaneously interrogated as signal sources. Switches SC1 and SC2 are therefore closed simultaneously to provide signal outputs through the odd and even signal buses to the signal scaling circuit 50, in which switch S is simultaneously closed for the averaging function as previously described. Switches HD1 and HD2 are closed to supply the outputs of dummy channels D1 and D2 as odd and even high frequency references, respectively, and switches LC3 and LC4 are closed to supply the outputs of channels C3 and C4 as odd and even low frequency references, respectively. The circuits 40 and 50 operate upon the thus received signals in the manner hereinbefore described.

In the next successive scanning step, channels D2 and C1 act as high frequency references with respect to channel C2 now individually interrogated as a signal source and channels C3 and C4 act as low frequency references. Thus, the sequence of scanning comprises alternate interrogation of single, or individual, and two consecutive, or adjacent, channels typically from one extreme of the frequency range to the other throughout the full range of frequencies of the bank of filter channels 10.

Figure 2:
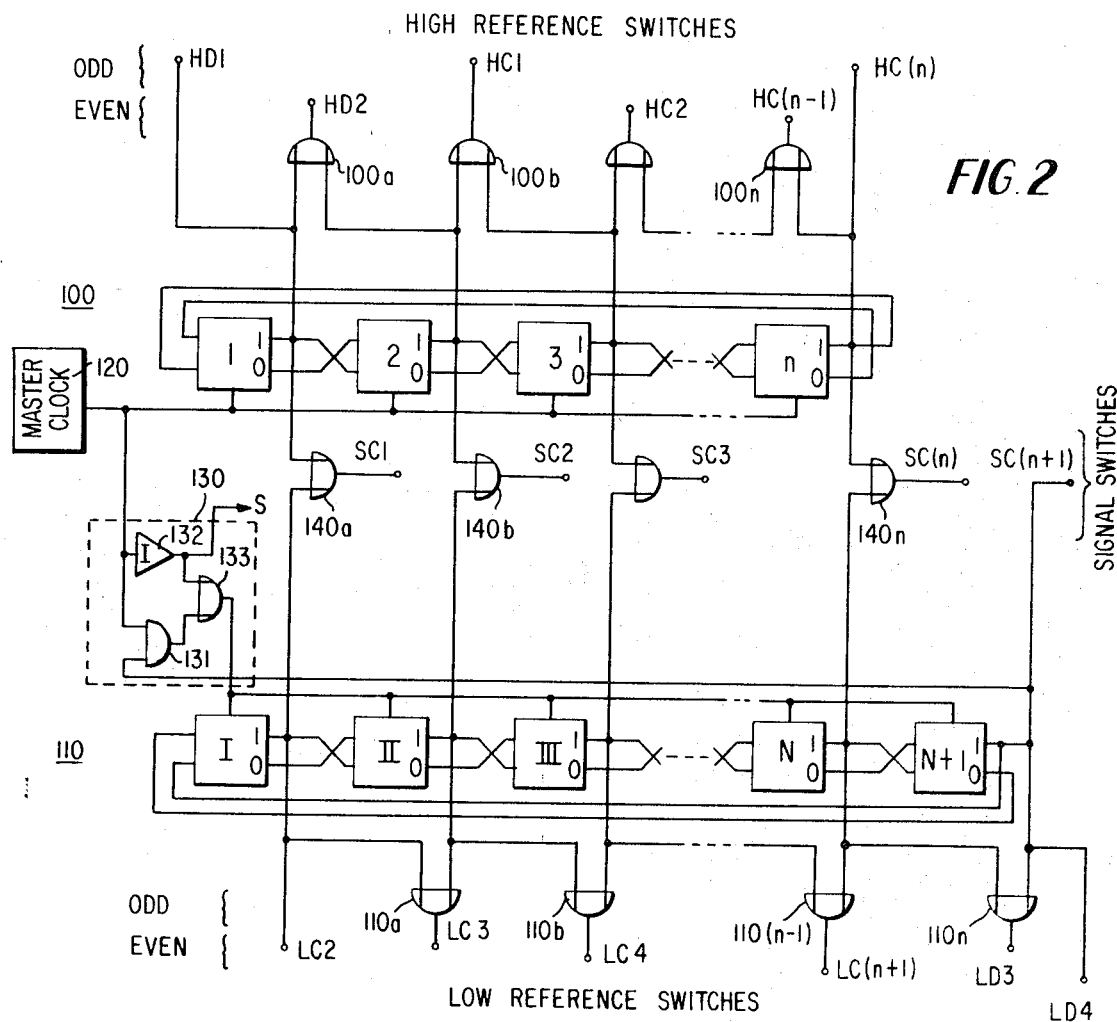
FIG. 2 is a schematic diagram of the first embodiment of gating and logic circuits in accordance with the commutation system of the invention.

In FIG. 2 is shown a scaling gating circuit providing for the selective actuation of the bank of switches 20 of the commutating system of FIG. 1. The timing chart of FIG. 3 serves to explain the operation of the gating system of FIG. 2 and concurrent reference will be had to FIGS. 2 and 3.

The commutation system of FIG. 2 includes two parallel sets of ring counters, or recirculating shift registers, 100 and 110. For convenience of identification, the stages of the shift register 100 are identified by arabic numerals 1, 2,...n and the stages of the shift register 110 are identified by Roman numerals I, II,...N+1. The shift registers 100 and 110 are of conventional type and respond to shift pulses applied thereto to switch a set stage to a reset condition and set the next successive stage, the set and reset states or conditions respectively producing outputs at the terminals 1 and 0. Successive pulses therefore successively reset each stage and set the next successive stage in a repeating cycle for all such stages. Each of the shift registers 100 and 110 is actuated in synchronized relationship in response to a train of clock pulses from the master clock 120. The stages of register 100 are switched from a reset to a set condition successively, and in response to, the leading edges of successive clock pulses. A scaling circuit 130, among other functions, inverts the clock pulses such that the stages of ring counter 110 are set successively, and in timed relationship to, the trailing edges of each clock pulse.

Figure 3:
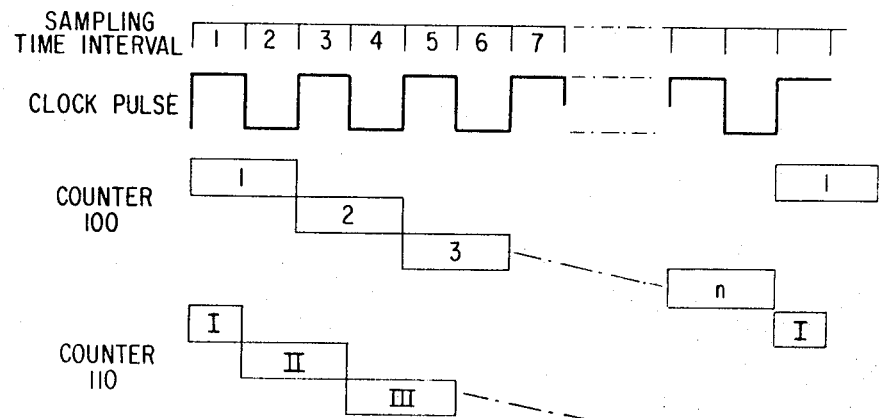
FIG. 3 is a timing chart for explaining the sequence of operation of the circuit of FIG. 2.

With reference to FIG. 3, the leading and trailing edges of the clock pulses are separated by identical time intervals and thus define, for the period of each clock pulse, two sampling time intervals of equal duration. The sampling intervals are numbered in consecutive order, and, arbitrarily, 1,2,...etc. to represent the relationship of the clock pulses, the sampling intervals, and the set conditions of the stages of the shift registers 100 and 110. The result of the opposite phase timed relationship of the setting of the stages of counters 100 and 110 on the leading and trailing edges of the clock pulses, in succession, results in the staggered and overlapped condition of the setting of related stages of the counters 100 and 110 as represented in FIG. 3. For example, the set state of stage II of counter 110 overlaps the set states of stages 1 and 2 of register 100 by equal amounts, and, with two exceptions, said states of all such stages are of equal duration, namely one clock pulse interval.

The exceptions comprise the first and last stages I and N+1 register 110, which are each set for only one-half a clock pulse, and thus for only one sample time interval. The purpose for this will be explained hereafter. The gating for accomplishing this setting includes the set output "1" of stage N+1 connected to one input of AND-gate 131 of scaling circuit 130 and the clock pulse input to the second input of AND-gate 131. In addition, an inverter 132 is connected to the output of the master clock source 120. The outputs of each of inverter 132 and AND-gate 131 are applied as inputs to OR-gate 133. The output of OR-gate 133 comprises the setting pulses for all stages of the register 110. In operation, each clock pulse is inverted by inverter 132 and passed through OR-gate 133 to result in the setting of the stages of register 110 in timed relationship to the trailing edge of the actual clock pulses. Actually, of course, the pulses applied to the stages of register 110 are of the same polarity as those applied to the stages of register 100. When the last stage N+1 of register 110 is in the set condition as represented in FIG. 3 by the block labeled N+1, the output from the set terminal thereof is applied to the AND-gate 131. Simultaneously with the leading edge of the next occurring clock pulse, AND-gate 131 is enabled and produces an output pulse passed through OR-gate 133 to set the first stage I of the register 110 and reset stage N+1.

Referring again to FIG. 2, there are associated with the stages of register 100 a plurality of OR-gates 100a, 100b, ...100n and with the stages of register 110 a plurality of OR-gates 110a, 110b,...110n. Each such OR gate gate receives as two inputs thereto the outputs from the set terminals of two adjacent stages. For example, OR-gate 100a receives as inputs the outputs from the set terminals of stages 1 and 2 of register 100. When either of the stages associated with a given OR gate is in a set condition, that OR gate produces an output. In addition, a first and last stage of each of the registers 100 and 110 produces a second output which is not associated with an OR-gate, as for example, the output labeled HD1 from the set terminal of stage 1 of register 100. The set terminals of corresponding stages of both registers 100 and 110 are further connected to a series of OR-gates 140a, 140b,...140n.

In operation, and with reference to the timing chart of FIG. 3, stages 1 and I are initially in the set state whereby the set outputs of each are applied to OR-gate 140a. OR-gate 140a is enabled by a signal applied at either of its inputs, and thus produces an output labeled SC1 which corresponds to a switching signal for closing the signal switch SC1 associated with channel C1 of the commutation system of FIG. 1. Channel C1 is thereby interrogated as a signal channel, or signal source, by connection of the output thereof to the odd signal bus and thus to the signal scaling circuit 50.

Simultaneously with the signal interrogation of channel C1, channels D1, D2, C2, and C3 are interrogated as reference frequency channels, or sources. In accordance therewith, the set output of stage 1 produces an output HD1 and, through OR-gate 100a, an output HD2 for closing the similarly labeled switches HD1 and HD2 to interrogate the dummy channels D1 and D2 in FIG. 1 as higher frequency reference sources. In addition, the set output of stage I simultaneously produces an output LC2 and, through OR-gate 110a, an output LC3 for closing the correspondingly labeled switches LC2 and LC3 in the commutation system of FIG. 1. Channels C2 and C3 are thereby interrogated as lower frequency reference channels for the channel C1 interrogated as a signal channel at this time.

During sampling time interval 2, an interpolation operation is performed, requiring simultaneous interrogation of the adjacent pair of channels C1 and C2 as signal channels, or sources, and of dummy channels D1 and D2 and channels C3 and C4 as reference channels, or sources. In register 100, stage 1 remains set but in register 110, stage I is now reset and stage II is set. Since stage 1 remains set, OR-gate 140a continues to pass the control pulse SC1 which maintains the switch SC1 closed for interrogation of channel C1 as a signal source. Since stage II is now set, OR-gate 140b gates a pulse SC2 to its output. The pulse SC2 from gate 140b closes the corresponding signal switch SC2 for interrogation of channel C2 as a signal source. As explained in more detail hereafter, the output of inverter 132, comprising the inverted master clock pulse train, provides an output S for closing switch S of scaling circuit 50 in FIG. 1, for the purpose as hereinbefore explained.

Stage 1 also continues to produce the signals HD1 and HD2 for interrogation of dummy channels D1 and D2 as higher frequency reference sources. The set output of stage II enables each of OR-gates 110a and 110b which produce outputs LC3 and LC4, respectively, for closing the similarly labeled switches LC3 and LC4 in the commutation system of FIG. 1 for reference interrogation of the channels C3 and C4.

The next clock pulse, corresponding to sampling time interval 3, resets stage 1 and sets stage 2 of counter 100. OR-gate 140a is now disabled, and thus channel C1 is no longer interrogated as a signal channel. OR-gate 140b, however, is now enabled by the set outputs of each of stages 2 and II. As is apparent from the foregoing description of operation, channel C2 is now interrogated as an individual signal source and channels D2, C1, C3, and C4 are interrogated as reference signal sources.

As noted previously, the registers 100 and 110 operate cyclically and in a synchronized manner whereby cyclical, or repetitive scanning of the bank 10 of filter channels is performed. In addition, in each such scan, the signal interrogation alternates between an interrogation of a single channel and simultaneous interrogation of two adjacent channels in accordance with the interpolation feature of the invention. In a preferred mechanization, the switches 20 of FIG. 1 comprise solid-state switching elements, assuring accurate and noiseless operation, and permitting rapid scanning rates. Suitable reset means (not shown) are provided to assure accurate timing of the cyclical operation of the registers 100 and 110, and thus also the application of the pulse output S to control switch S in the interpolation operation, as will be apparent to those skilled in the art.

Figure 4:
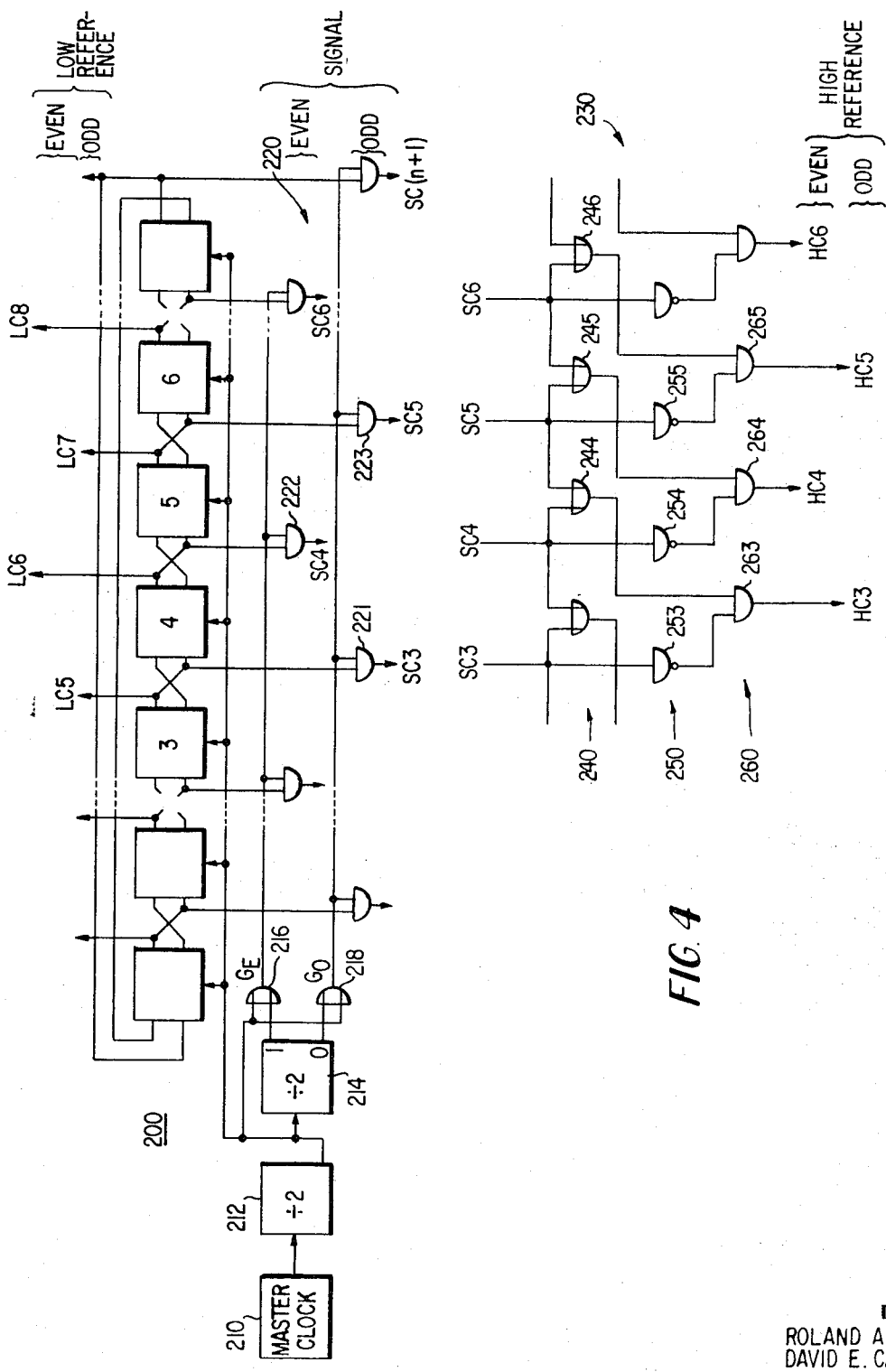
FIG. 4 is a schematic diagram of a second embodiment of gating and scaling circuits in accordance with the commutation system of the invention.

In FIG. 4 is shown a second embodiment of gating and scaling circuits for the commutation system of the invention. The circuit of FIG. 4 may be employed in the alternative to the circuit of FIG. 2 for effecting the selective switch actuation of the commutation system of FIG. 1. The control signals produced by the circuit of FIG. 4 therefore serve the identical function as the control signals generated by the circuit of FIG. 2 and are therefore identified with identical labels. The circuit of FIG. 4, by comparison to that of FIG. 2, employs only a single shift register and associated scaling gating circuits and thus may be constructed at a reduced cost.

The following description of the circuit of FIG. 4 is therefore limited to that sufficient for understanding the operation thereof. To explain the operation of the circuit of FIG. 4, concurrent reference will be had to the timing chart of FIG. 5.

A shift register 200 includes a plurality of stages, only several of which are shown and particularly stages 3 through 6 are identified. The shifting operation of the register 200 comprises the successive advancement of a pair of ones through the successive stages of a shift register—i.e., two adjacent stages are always in the set condition and propagation through the shift register comprises the successively advanced setting of each such successive pair of stages.

Figure 5:
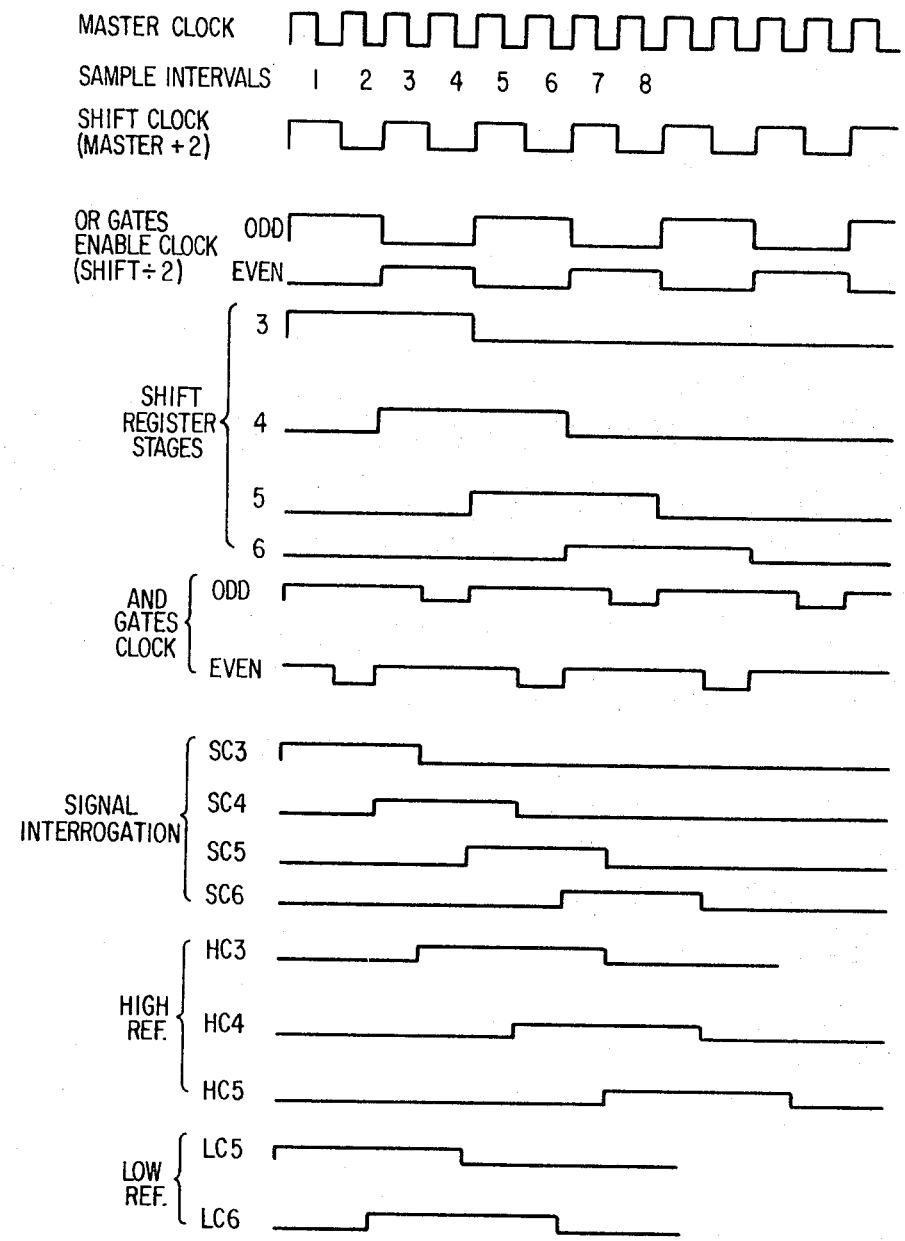
FIG. 5 is a timing chart for explaining the sequence of operation of the circuit of FIG. 4.

A master clock pulse source 210 provides a train of equally spaced, well-defined clock pulses, the period of each clock cycle defining a sampling interval. A frequency dividing circuit 212 receives the master clock pulses and produces a pulse train output of one-half the master clock frequency which is applied as a shift clock pulse train to the stages of the register 200. As seen in FIG. 5, the shift clock is one-half the frequency of the master clock and each period thereof comprises two sample intervals. The output of circuit 212 is also applied as an input to a similar circuit 214 which performs the same function of dividing the input pulse frequency in half. Circuits 212 and 214 may be identical and comprise conventional bistable multivibrators, or flip-flops, switched between set and reset states by successive input pulses. Outputs for both the set and reset stages of the circuit 214, as identified by the terminals "1" and "0", respectively, are employed as inputs to OR-gates 216 and 218, respectively. Each of OR-gates 216 and 218 receives as a second input the output of circuit 212, comprising a pulse train identical to the shift clock pulse train.

A plurality of AND-gates 220 are arranged in even and odd sets which are alternately conditioned, by the outputs of the OR-gates 216 and 218. The plurality of AND-gates 220, of both even and odd sets, are enabled in succession by the further output of the respectively associated stages of the shift register 200. Thus, for example, AND-gate 222 of the even set thereof is connected at the first input thereof to the output of OR-gate 216 and at the second input thereof to the output of stage 4 of register 200. The AND-gates 221 and 223 of the odd set are connected at the first inputs thereof to the output of OR-gate 218 and at the second inputs thereof to the outputs of stages 3 and 5, respectively, of the register 200.

As noted, propagation through the shift register 200 occurs by advancement of adjacent "1's" through adjacent, successive pairs of stages. Further, the shift clock rate is one-half the sampling rate. Thus, as shown in FIG. 5, for shift register stages 3 through 6, each is in an on, or set, state for four sample time intervals. The outputs of the even and odd OR-gates 216 and 218 are also shown therein and identified by the labels AND gates clock-odd and -even, in accordance with the application of these pulse trains to the bank of AND-gates 220, also identified by odd and even groups.

The enabling of the plurality of AND-gates 220, in response to the AND gates clock trains from OR-gates 216 and 218 and the outputs of the respectively associated shift register stages, produces signal interrogation pulses, or control signals. In FIG. 5 are shown a few of these pulses, and particularly the pulses SC3 through SC6, corresponding to stages 3 through 6. Each of these pulses is of a duration of three sample intervals. In accordance with the foregoing description of operation, each channel is interrogated as a signal source for three consecutive sample time intervals and particularly, initially as one of a pair of interpolation signal interrogated channels, in a second interval as an individually interrogated signal channel, and in a third consecutive interval as one of a further pair of interpolation signal interrogated channels.

These different successive operations are readily appreciated from FIG. 5. With respect to the signal interrogation pulse SC4, a first interval thereof occurs in common with the last interval of pulse SC3 for simultaneous interrogation of channels 3 and 4 for interpolation. A second interval of pulse SC4 exists exclusively of other signal interrogation pulses, and a third interval thereof corresponds with the first interval of pulse SC5 for simultaneous signal interrogation of channels 4 and 5 for interpolation. The pulses SC3 through SC6 actuate correspondingly identified signal switches in accordance with the identifying nomenclature of FIG. 1.

The outputs of the stages of the shift register 200 conveniently are employed directly as the control signals for interrogation of two adjacent channels as lower frequency reference sources. Thus, in FIG. 4 there are indicated control signals LC5 through LC8 produced by the set outputs of shift register stages 3 through 6, respectively, the pulse waveforms of which as shown in FIG. 5 are thus identical to the set intervals of the corresponding stages. It will readily be appreciated that the thus generated, lower frequency reference interrogation pulses, such as LC5 and LC6, are of the required duration and occur in proper timed relationship for the respectively associated signal channel interrogation operations. For example, the pulse LC5 is maintained for all three sample intervals encompassed by pulse SC3, and for the first two intervals of pulse SC4 but terminated prior to the last sample interval of pulse SC4, and thus prior to the initiation of pulse SC5.

The higher frequency reference OR-gate interrogation is performed by a scaling network 230, the inputs of which are connected to the outputs of the bank 220 of AND gates and thus are identified by the signal outputs of those AND gates in a corresponding manner. The scaling circuit 230 includes a first stage of OR-gates 240, a second stage of inverters 250, and a third stage of AND-gates 260. The outputs of AND-gates 260, such as HC3 to HC6, comprise the higher frequency reference channel control signals for actuation of the corresponding switches of the commutation system of FIG. 1 for interrogation of correspondingly numbered channels as higher frequency reference channels.

As one example of operation, during pulse SC6, OR-gate 246 is enabled to provide a first input to AND-gate 265. During the common sampling time of pulses SC5 and SC6, pulse SC5 similarly enables OR-gate 245 to provide a first enabling input to AND-gate 264. Inverter 255 responds to pulse SC5, however, to invert the signal and thus prevent enabling of AND-gate 265. Appropriately, therefore, pulse HC5 is not produced while pulse SC5 exists, since signal channel 5, as other channels, is never simultaneously interrogated as both a signal and a reference signal source. However, since pulse SC4 is not generated at this time, inverter 254 produces a second enabling input to AND-gate 264, which thus produces the output pulse HC4. In addition, OR-gate 244 responds to pulse SC5 to provide a first input to AND-gate 263; similarly to the foregoing explanation, inverter 253 responds to the absence of pulse SC3 for providing a second enabling input to AND-gate 263 which thereby produces output signal HC3. Thus, during the interpolation interrogation of both channels 5 and 6, channels 4 and 3 are interrogated as higher frequency reference sources. By a similar analysis, it is apparent that when channel 6 is separately interrogated as an individual signal source during the next successive sampling interval, pulse HC3 is no longer produced. However, pulse HC4 continues to be produced, and pulse HC5 is now produced whereby channels 4 and 5 are interrogated as reference sources for the signal interrogated channel 6. The waveforms of reference control pulses HC3–HC5 and their relationship to the corresponding signals SC3 through SC6 in accordance with the foregoing description are shown in FIG. 5.

The explanation of FIG. 4 has been provided for the most general case in which each channel is interrogated for three successive sampling intervals. Similarly to the system of FIG. 2, the system of FIG. 4 provides for limited interrogation of channels at either extreme of the bank of channels, including dummy channels, as will be apparent.

The commutation system of the invention thus provides for rapidly and repetitively performing the complex function of successive interrogation of a plurality of signal sources comprising alternating individual and consecutive pairs of signal channels in accordance with the interpolation feature of the invention, while simultaneously selecting the two higher and two lower frequency channels as reference sources for establishing a threshold detection level, the amplitude of which is a function of and varies with the noise and clutter in the received signals for any given frequency of an interrogated signal source. The processing method of the invention assures far greater accuracy in the target detection operation and velocity measurements to be performed by a pulse Doppler radar system. Preferably, the commutating switches and all gating and scaling systems are provided by solid state devices to assure minimum internal noise generation and maximum accuracy, reliability, and speed. It will be appreciated that any suitable gating system may be employed which will effect the commutation in the described manner. As previously noted, the number of reference channels and their relative positions in relation to simultaneously interrogated signal channels may be varied from that shown herein, and particularly as required for maximizing the benefits of the invention in view of the operating parameters and conditions of a given system.

We claim as our invention:

1. In a pulse Doppler radar system having a plurality of filter channels of predetermined bandwidths and different, successive ranges of frequencies to which received signals are applied and each of which produces an output responsive to the received signal content in the corresponding frequency range, a method for processing the filter channel outputs comprising:
    applying received signals to said plurality of filter channels,
    interrogating said filter channels in succession to define a plurality of signal sources throughout a predetermined range of frequencies to be examined for the detection of target signals,
    selecting filter channels having outputs of predetermined frequency relationship to said signal sources to define a plurality of reference sources corresponding to the plurality of signal sources,
    interrogating said corresponding reference source filter channels in simultaneous succession with the interrogation of said signal source filter channels, and
    comparing the values of the signal sources with the values of the corresponding reference sources in each successive simultaneous interrogation to detect as target signals all signal sources having values exceeding the values of the corresponding reference sources in accordance with a predetermined relationship therebetween.

2. A processing method as recited in claim 1, further comprising:
    interrogating said filter channels in an alternate succession of individual, successive filter channels and respectively next successive adjacent pairs of filter channels to define as the plurality of signal sources the alternate succession of outputs of individual, successive filter channels and interpolated filter channel outputs comprising the average of the outputs of adjacent pairs of filter channels.

3. A processing method as recited in claim 1 further comprising:
    selecting as reference sources for each signal source, filter channels of higher and lower frequencies than that of the corresponding signal source, and
    comparing the value of each signal source with the average value of the corresponding higher and lower frequency reference sources, for each signal source in succession.

4. A processing method as recited in claim 3 comprising:
    selecting as reference sources corresponding to each signal source the two successively higher frequency and the two successively lower frequency filter channels.

5. A processing method as recited in claim 3 comprising:
    interrogating said filter channels in an alternate succession of individual, successive filter channels and respectively next successive adjacent pairs of filter channels to define as the plurality of signal sources the alternate succession of outputs of individual, successive filter channels and interpolated filter channel outputs comprising the average of the outputs of adjacent pairs of filter channels.

6. In a pulse Doppler radar system having a plurality of filter channels of predetermined bandwidths in different, successive ranges of frequencies to which received signals are applied and each of which produces an output responsive to the received signal content in the corresponding frequency range, a commutation and signal processing system comprising:
    means for interrogating said filter channels selectively and in succession to derive from the outputs thereof a plurality of signal sources over a predetermined range of frequencies to be examined for the detection of target signals,
    means for interrogating selected ones of said filter channels to define a plurality of reference sources corresponding to and of predetermined frequency relationship to each of said signal sources,
    means for simultaneously actuating said signal sources and said corresponding reference sources in succession, and
    means for comparing the values of the signal sources with the values of the corresponding reference sources in each successive simultaneous interrogation to detect as target signals all signal sources having values exceeding the values of the corresponding reference sources in accordance with a predetermined relationship therebetween.

7. A system as recited in claim 6 wherein:
    said interrogating means for deriving said signal sources comprises a first plurality of switches respectively associated with the plurality of filter channels to be interrogated as signal sources and selectively actuable by said actuating means for interrogating the respectively associated filter channels as signal sources, and
    said interrogating means for defining said reference sources comprises a second plurality of switches respectively associated with the plurality of filter channels to be interrogated as reference sources and selectively actuatable by said actuating means for interrogating the respectively associated filter channels as reference sources.

8. A system as recited in claim 7 wherein said comparing means includes:
    signal source scaling means connected in common to said first plurality of switches,
    reference source scaling means connected in common to said second plurality of switches, and
    a comparison circuit connected to said signal source scaling means and to said reference source scaling means.

9. A system as recited in claim 7, wherein: said interrogating means for defining said reference sources provides for interrogation of selected higher and lower frequency channels defining higher and lower frequency reference sources corresponding to each of said signal sources, and
    said second plurality of switches includes a first set thereof connected to said filter channels and selectively actuatable for defining higher frequency reference sources and a second set thereof connected to said filter channels and selectively actuatable for defining lower frequency reference sources respectively corresponding to each of said plurality of signal sources.

10. A system as recited in claim 9 wherein:
    said interrogation means for defining said reference sources provides for interrogation of the next two successively higher and the next two successively lower frequency channels for defining corresponding reference sources for each of said signal sources.

11. A system as recited in claim 7 wherein:
    said actuating means including means to selectively actuate said first plurality of switches in an alternate succession of individual switches associated with successive individual filter channels and pairs of switches associated with respectively next successive pairs of filter channels to define as the plurality of signal sources the alternate succession of outputs of the individual, successive filter channels and interpolated filter channel outputs comprising the average of the outputs of the next successive pairs of filter channels.

12. A system as recited in claim 6 wherein said actuating means comprises:
    first and second shift register means each having a plurality of stages with the stages of said first shift register respectively associated with odd numbered ones of said plurality of filter channels and the stages of said second shift register respectively associated with even numbered ones of said plurality of filter channels, said first and second shift registers being responsive to opposite phases of a shift register clock pulse train for switching each stage between set and reset states at a rate one-half the rate of interrogation of successive signal sources, cyclically and in succession for the plurality of stages of each shift register.

13. A system as recited in claim 12 wherein:

each stage of said first shift register, when set, provides for interrogation of a reference source filter channel next preceding a simultaneously interrogated signal source filter channel, and each stage of said second shift register, when set, provides for interrogating a reference source filter channel next succeeding a simultaneously interrogated signal source filter channel.

14. A system as recited in claim 13 wherein each stage of each of said first and second shift register means, when set, provides for interrogation of two reference source filter channels next succeeding and next preceding, respectively, simultaneously interrogated signal source filter channels.

15. A system as recited in claim 6 wherein said actuating means comprises:

shift register means having a plurality of stages respectively corresponding to the plurality of filter channels and adapted to be switched to a set state in successive pairs thereof, each state maintained in a set state for four equal intervals and gating means associated with and responsive to each of said shift register stages and enabled during the first three successive intervals of the set states thereof for generating interrogation signals for interrogating the respectively corresponding filter channels.

16. A system as recited in claim 15 wherein:

said gating means includes a plurality of gates respectively associated with said shift register stages, and each of said gates is individually enabled during the second of said three interrogation intervals and pairs of adjacent ones of said gates are simultaneously enabled during the first and third of said interrogation intervals for interrogating said plurality of filter channels in an alternate succession of individual and successive pairs thereof to define as the plurality of signal sources the alternate succession of outputs of individual, successive filter channels and interpolated outputs comprising the average of the outputs of successive, adjacent pairs of filter channels.

17. A system as recited in claim 15 wherein said interrogation means for defining said reference sources includes:

means respectively associated with said stages of said shift register and responsive to the set states thereof for interrogating a predetermined lower frequency filter channel as a lower frequency reference source simultaneously with the interrogation of a signal source filter channel respectively associated therewith, and gating means respectively associated with said signal source gating means and responsive to the signal source interrogation signals generated thereby for interrogating a predetermined higher frequency filter channel as a higher frequency reference source for each interrogated signal source filter channel.

* * * * *